May 11, 1965  C. ADLER, JR  3,183,480
ROTATING ANTI-COLLISION LIGHTS FOR AIRCRAFT
Filed Nov. 5, 1962
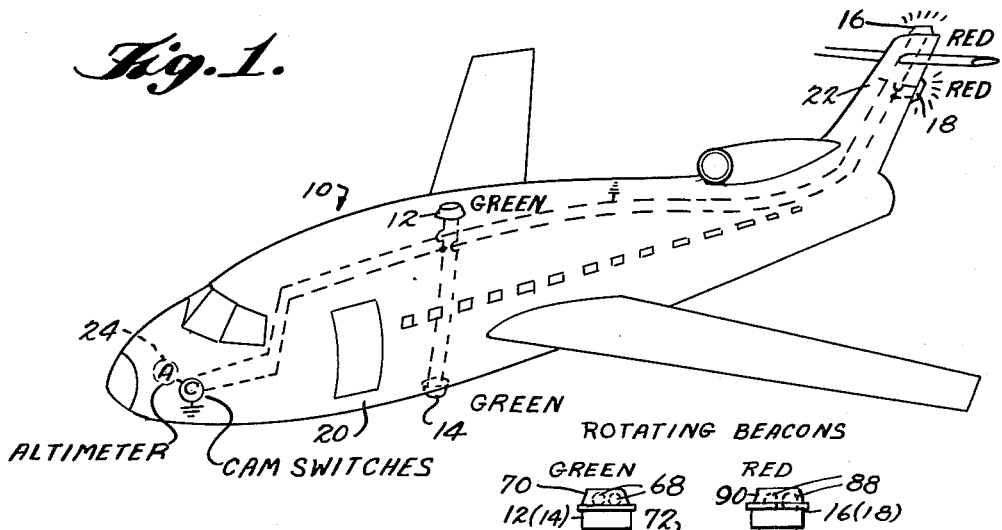
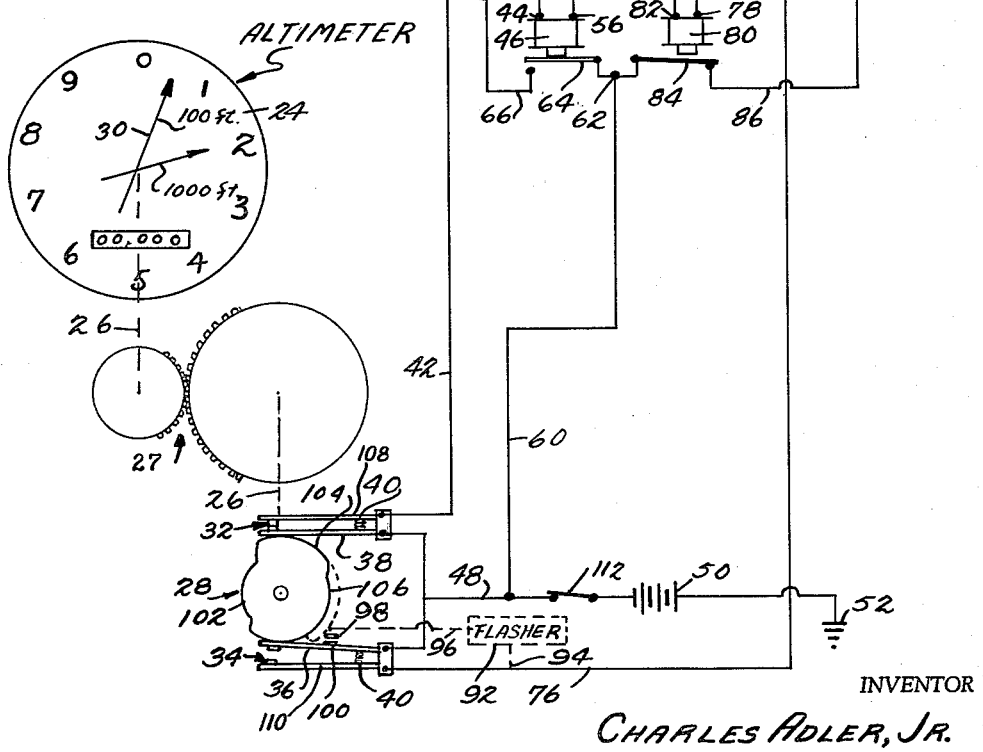
INVENTOR
CHARLES ADLER, JR.
BY Cushman, Darby & Cushman
ATTORNEYS United States Patent Office 3,183,480
Patented May 11, 1965

3,183,480
ROTATING ANTI-COLLISION LIGHTS FOR AIRCRAFT
Charles Adler, Jr., 609 W. North Ave., Baltimore 17, Md.
Filed Nov. 5, 1962, Ser. No. 235,562
6 Claims. (Cl. 340—27)

This invention relates to aircraft safety and more particularly to a system for automatically indicating the altitude of an aircraft with means visible to other aircraft and to ground observers.

As the density of air traffic has increased the probability of two or more aircraft being at the same altitude near the same area, and the danger of mid-air collision between or among them has increased in proportion. To solve this mounting hazard the federal authorities entrusted with the regulation of air traffic have put into operation aircraft routing systems employing three dimensional grids having various levels and sectors. Complex electronic equipment at ground stations is used to assign flight levels to all aircraft to minimize collision danger. These levels are most often delimited in their upper and lower bounds by imaginary planes parallel to the mean surface of the earth. Theoretically each aircraft that can possibly be in a particular area at a particular time has been assigned a different level so that there will be no collisions but in actual practice, aircraft, in changing levels or in straying from an assigned level to an adjacent level because of air currents, preoccupation of aircraft personnel with other matters, or the like, collide with one another causing much property damage, personal injury and death. One cause of these collisions is that although a pilot can determine his own altitude by observing his altimeter, there has been no system applicable to all aircraft allowing aircraft flight personnel to quickly determine the flight level being occupied by another aircraft nearby.

It is therefore an object of this invention to provide a system applicable to all aircraft that will indicate the flight level occupied by an aircraft to observers outside the aircraft.

A further object of this invention is to provide a system that will indicate the flight level occupied by an aircraft by means of lights mounted on the exterior of the aircraft.

Another object of this invention is to provide an anti-collision system whereby lights of one color, mounted on the exterior of an aircraft will be automatically extinguished and lights of another color, mounted on the exterior of the aircraft will be automatically lit as the aircraft, in changing altitude, moves from one flight level to another.

Yet another object of the present invention is to provide an aircraft anti-collision system wherein indicating lights of a first color, mounted on the exterior of the aircraft, are lit when the aircraft is within a level whose upper bound is an even-numbered thousand feet, viz. 2000, 16,000, 30,000 feet and wherein indicating lights of a second color, mounted on the exterior of the aircraft, are lit when the aircraft is within a level whose upper bound is an odd numbered thousand feet, viz. 1000, 15,000, 29,000 feet.

It is an important object of this invention to provide a system, applicable to all aircraft that will allow the flight personnel of an aircraft to determine the flight level being occupied by another aircraft by merely observing the other aircraft.

It is a further object of the present invention to provide an aircraft anti-collision system wherein altitude indicating lights mounted on the exterior of the aircraft are automatically selectively lit through the action of the aircraft altimeter as the aircraft moves from one flight level to another.

These and other objects of the present invention will become more apparent during the course of the following detailed explanation, the attached drawing and the appended claims.

The invention can be best understood having reference to the attached drawing wherein an illustrative embodiment is shown. In the drawing:

FIGURE 1 is a perspective view of an aircraft employing the anti-collision light system of the invention;

FIGURE 2 is a diagrammatic representation of one embodiment of the present invention.

Referring now more particularly to the drawing, an aircraft is generally indicated at 10 having indicating lights, more specifically rotating beacons 12, 14, 16 and 18 mounted thereon.

In the embodiment shown, beacons 12 and 14 have green lenses and are located on the upper and lower surfaces respectively of the aircraft fuselage 20, intermediate the ends of the fuselage. The beacons 16 and 18 have red lenses and are located on the upper edge and the trailing edge of the aircraft vertical stabilizer 22, respectively.

As best shown in FIGURE 2, the illuminating and extinguishing of rotating beacons 12, 14, 16 and 18 is controlled by the aircraft altimeter 24, which may be a barometric, electronic or any other type. In the diagram of the embodiment shown in FIGURE 2 only one green beacon 12 and one red beacon 16 have been shown for the purpose of lucid illustration. It should be understood that additional beacons could be wired in the circuit to coact with the beacons shown. The indicating means of the altimeter 24 is mechanically or electro-mechanically connected, as by a shaft 26 to a switch operating cam 28. Mounted on shaft 26 intermediate altimeter 24 and cam 28 is a 2:1 gear reduction means indicated generally at 27 so that a change in altitude of 1000 feet, which causes the 100's indicator 30 of the altimeter 24 to make one revolution, will cause the cam 28 to rotate half a revolution. In like manner a change in aircraft altitude of 2000 feet, which causes the 100's indicator 30 of the altimeter 24 to make two complete revolutions, will cause the cam 28 to rotate one complete revolution. Mounted adjacent the periphery of cam 28 are switches 32 and 34 having inner arms 36 and 38 respectively which are urged against the cam as by springs 40.

In the diagram shown switch 32 is connected by line 42 to pole 44 of a solenoid 46, and by line 48 to a source of electrical potential 50 which may be a generator powered by the aircraft. This circuit is completed by connections to ground 52 and 54 respectively on the low side of the electrical potential source 50 as by line 48 and to pole 56 of solenoid 46 as by line 58. Intersecting line 48 at a point between switch 32 and electrical potential source 50 is a line 60 which is connected at junction 62 through a relay 64 to line 66. Relay 64 is normally closed when switch 32 is open, but is opened by solenoid 46 when switch 32 is closed. Line 66 is connected to a beacon 12 (14) which has rotatable lights 68 disposed within a green lens 70. This circuit is completed by a line 72 which connects the beacon 12 (14) to ground 74. In like manner switch 34 is connected by line 76 to pole 78 of a solenoid 80 and by common line 48 to electrical potential source 50. This circuit is completed by connections to ground 52 and 54 respectively on the low side of the electrical potential source 50, as by line 48 and to pole 82 of solenoid 80, as by common line 58. Common line 60 connects switch 34 through a relay 84 to line 86. Relay 84 is normally closed when switch 34 is open, but is opened by solenoid 80 when switch 34 is closed. Line 86 is connected to a beacon 16 (18) which has rotatable lights 88 disposed within a red lens 90. This circuit is completed by common line 72 which connects the beacon 16 (18) to ground 74.

Additionally, according to one embodiment a conventional intermittent flasher 92 is connected in one of the beacon circuits as by lines 94 and 96 shown in FIGURE 2. Line 96 ends in a contact 98 adapted to be engaged by contact 100 on inner arm 38 of switch 34.

In one embodiment of the system shown in FIGURE 2 the cam 28 is generally cylindrical and has a low surface 102 extending through one quadrant of its circumference, and adjacent complementary high surface 104 extending clockwise therefrom through one quadrant of the cam surface and an adjacent complementary intermediate surface 106 extending anti-clockwise from surface 102 through two quadrants of the cam surface.

*Operation*

In the operation of this embodiment of the invention a particular cam surface is in contact with each of switch inner arms 36 and 38 only depending on the altitude of the aircraft because cam 28 is connected through 2:1 gear reduction means 27 to the aircraft altimeter 24. As shown, when the aircraft is between an odd thousand and 500 feet thereabove (i.e., 1000–1500, 3000–3500 etc.) cam high surface 104 will urge inner arm 38 against outer arm 108 completing a circuit through switch 32, and cam intermediate surface 106 allows switch 34 to be in an open position intermediate outer arm 110 and flasher contact 98. With the cam 28 in this position the circuit, through the green beacon 12 (14) is interrupted by solenoid 46 opening relay 64 and the circuit through the red beacon 16 (18) is closed (current through solenoid 80 is interrupted by open switch 34). Therefore, red beacon 16 (18) is illuminated and rotating and green beacon 12 (14) is dark.

When the aircraft is between 500 feet above an odd thousand and an even thousand (i.e. 1500–2000, 3500–4000, etc.) cam intermediate surface 106 allows inner arm 38 to be urged away from contact with outer arm 108 by spring 40, and cam low surface 102 allows inner arm contact 100 to be urged against flasher contact 98 by spring 40. With the cam 28 in this position, the circuit through the green beacon 12 (14) is closed (current through solenoid 46 is interrupted by open switch 32) and the circuit through the red beacon 16 (18) is intermittently interrupted and closed by flasher 92 alternately opening and closing circuit through solenoid 80. Therefore, green beacon 12 (14) is illuminated and rotating and red beacon 16 (18) is illuminated, rotating and flashing.

When aircraft is between an even thousand feet and 500 feet thereabove (i.e. 2000–2500, 4000–4500, etc.) cam high surface 104 will urge inner arm 36 against outer arm 110 completing a circuit through switch 34, and cam intermediate surface 106 allows switch 32 to be urged in an open position by spring 40. With the cam 28 in this position, the circuit through the red beacon 16 (18) is interrupted by solenoid 80 opening relay 84 and the circuit through the green beacon 12 (14) is closed (current through solenoid 46 is interrupted by open switch 32). Therefore, green beacon 12 (14) is illuminated and rotating and red beacon 16 (18) is dark.

When the aircraft is between 500 feet above an even thousand and an odd thousand (i.e. 2500–3000, 4500–5000 etc.) cam low surface 102 allows inner arm 38 to be urged by spring 40 away from contact with outer arm 108 thereby opening switch 32, and cam intermediate surface 106 allows inner arm 36 to be urged by spring 40 to an open position intermediate outer arm 110 and flasher contact 98. With cam 28 in this position the circuit through the green beacon 12 (14) is closed (current through solenoid 46 is interrupted by open switch 32) and the circuit through the red beacon 16 (18) is closed (current through solenoid 80 is interrupted by open switch 34). Therefore, green beacon 12 (14) is illuminated and rotating, and the red beacon 16 (18) is illuminated and rotating.

A switch 112 may be provided to turn off the system when the aircraft is not airborne.

As the aircraft moves up or down during flight the altimeter 24 acting through the cam 28 automatically causes beacons 12, 14, 16 and 18 mounted on the exterior of the craft to indicate the altitude of the craft to observers in other aircraft or on the ground. An aircraft pilot observing the beacon lights of another aircraft can immediately discern whether the other craft is above, below or within his own flight level and can observe if the other craft changes levels downward or upward and take appropriate action to safeguard his aircraft, the other aircraft and the lives of those aboard each.

Because the system shown uses inexpensive, reliable components it is readily adaptable to a national or international control system comprehending private, commercial and military aircraft.

A more rudimentary embodiment of the system is also shown in FIGURE 2. According to this alternative flasher 92, lines 94 and 96 are omitted from the circuit and cam high surface is extended clockwise around the cam an additional quadrant as shown in dotted lines. Acting as set forth above the cam in this embodiment causes red beacon to be illuminated and rotating and green beacon to be dark when the aircraft is above an odd thousand foot plane and below an even thousand foot plane. Likewise when the aircraft is above an even thousand foot plane and below an odd thousand foot plane the altimeter, acting through the cam causes the green beacon to be illuminated and rotating and the red beacon to be dark.

The first embodiment is applicable to a system wherein air traffic control authorities desire a plan having a 500 foot discrimination of altitude whereas the second embodiment is applicable to a plan or convention wherein authorities desire only a 1000 foot discrimination.

It is clear that in the same manner, using additional cam surfaces and the like, discrimination may be refined to 250, and 100 foot levels or as fine as desired by the authorities who would establish a standard.

Although rotating red and green beacons have been shown for illustration, it is understood that nonrotation beacons and beacons having lenses of colors other than red and green may be established as a standard to avoid confusion with traditional navigational aids.

While specific embodiments of this invention have been shown and discussed in order that the principles of the invention might be lucidly set forth, it should be understood that many substitutions, additions and deletions in the embodiments shown are possible without departing from the principles of this invention and therefore this invention is limited only by the spirit and scope of the following claims.

What is claimed is:

1. An aircraft anti-collision system comprising at least one beacon of a first color mounted on the exterior of an aircraft, at least one beacon of a second color mounted on the exterior of an aircraft, and means including switching means coupled to said beacons, for responding to the altitude of the aircraft so as to illuminate a beacon of said first color and extinguish a beacon of said second color when the aircraft is flying within particular predetermined intervals of altitudes and so as to extinguish a beacon of said first color and illuminate a beacon of said second color when the aircraft is flying within other particular predetermined intervals of altitude, whereby observers outside the aircraft have a visual indication of the altitude of the aircraft.

2. An aircraft anti-collision system comprising a first visual indicating means and a second and different visual indicating means mounted on the exterior of an aircraft, a source of electrical potential connected to each indicating means, a circuit interrupting means interposed between each visual indicating means and the source of electrical potential therefor, and means responsive to the altitude of the aircraft selectively operating said first and second indicating means by said circuit interrupting means according to a pattern established for visual indications from said indicating means relative to altitude so that observers outside said aircraft are apprised of the relative altitude of the aircraft by the visual indications supplied by said indicating means.

3. An aircraft anti-collision system comprising a generally cylindrical cam mechanically connected to the aircraft altimeter so that the cam has a definite position for any altitude of the aircraft, at least two complementary camming surfaces together extending around the circumference of the cam, at least two switches adapted to be opened and closed by the camming surfaces, an electrical power source, beacons of at least two colors mounted on the exterior of the aircraft, electrical circuits connecting each beacon of a first color to said power source, and electrical circuits connecting each beacon of a second color to said power source, at least one of said switches interposed in each of said circuits illuminating and extinguishing said beacons in response to the cam surfaces.

4. An aircraft anti-collision system comprising a beacon of a first color mounted on the underside of an aircraft fuselage, a second beacon of the first color mounted on the upper surface of the aircraft fuselage, beacon means of a second color mounted on the aircraft vertical stabilizer, the trailing surface of the aircraft vertical stabilizer, said first color beacon means and said second color beacons each being operably connected through normally closed relays to a cam operated switch, said cam being mechanically connected to the altimeter of the aircraft through a gear reduction means so that the cam is rotated clockwise and anti-clockwise in proportion to the upward and downward movement of the aircraft with respect to the ground, the surfaces of said cam coacting with the switch for each beacon circuit opening and closing said relays whereby said beacons and beacon means are illuminated and are extinguished according to the predetermined program of the cam as the aircraft moves upward and downward thereby indicating the altitude and movement of the aircraft to observers on the ground and to flight personnel in other aircraft.

5. An aircraft anti-collision system comprising a first means indicating the altitude of an aircraft to flight personnel on the aircraft and a second means indicating the altitude of the aircraft to ground observers and flight personnel of other aircraft, said second means comprising a plurality of beacons mounted on the exterior of the aircraft, a power source in circuit with each beacon and a circuit interrupting means interposed in each circuit, said circuit interrupting means being selectively operated by said first altitude indicating means illuminating and extinguishing said beacons according to a predetermined convention established by air traffic authorities.

6. An aircraft anti-collision system comprising a plurality of electric light beacons mounted on the exterior of aircraft, at least one of the beacons on each aircraft being of a different color than the remainder of said beacons, a source of electric power on each aircraft, an electrical circuit connecting each beacon to a power source, a circuit interrupting means interposed in each circuit, and means responsive to the altitude of each aircraft employing said circuit interrupters according to a uniform plan whereby the flight personnel on an aircraft, by observing the color and duration of the illumination of the beacons on other aircraft, have an indication of the altitude of the other aircraft.

References Cited by the Examiner
UNITED STATES PATENTS

| | | | |
|---|---|---|---|
| 2,505,314 | 4/50 | Wallace et al. | 340—183 |
| 2,735,081 | 2/56 | Hosford | 340—27 |
| 2,832,059 | 4/58 | Adler | 340—25 |
| 3,102,993 | 9/63 | Jensen | 340—25 |

NEIL C. READ, *Primary Examiner.*